(12) United States Patent
Kang

(10) Patent No.: US 12,347,822 B2
(45) Date of Patent: Jul. 1, 2025

(54) SECONDARY BATTERY

(71) Applicant: Samsung SDI Co., Ltd., Yongin-si (KR)

(72) Inventor: Shin Gun Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/327,711

(22) Filed: Jun. 1, 2023

(65) Prior Publication Data

US 2023/0327176 A1 Oct. 12, 2023

Related U.S. Application Data

(63) Continuation of application No. 16/613,090, filed as application No. PCT/KR2017/014046 on Dec. 4, 2017, now Pat. No. 11,688,877.

(30) Foreign Application Priority Data

May 30, 2017 (KR) .......................... 10-2017-0066844

(51) Int. Cl.
*H01M 10/04* (2006.01)
*H01M 50/105* (2021.01)

(52) U.S. Cl.
CPC ..... *H01M 10/0431* (2013.01); *H01M 50/105* (2021.01)

(58) Field of Classification Search
CPC .......................... H01M 10/0431; H01M 50/105
See application file for complete search history.

(56) References Cited

U.S. PATENT DOCUMENTS

| 7,410,723 B2 | 8/2008 | Kim et al. |
| 7,803,479 B2 | 9/2010 | Lee |

(Continued)

FOREIGN PATENT DOCUMENTS

| EP | 3091593 A1 * | 11/2016 | ........ H01M 10/0525 |
| JP | 2002042773 A | 2/2002 | |

(Continued)

OTHER PUBLICATIONS

Korean Office action for Patent Application No. 10-2017-0066844, dated Sep. 27, 2021, 7 pages.

(Continued)

*Primary Examiner* — Niki Bakhtiari
*Assistant Examiner* — Niara Trant
(74) *Attorney, Agent, or Firm* — Womble Bond Dickinson (US) LLP

(57) ABSTRACT

Disclosed is a secondary battery comprising: an electrode assembly in which a first electrode plate, a second electrode plate, and a separator are rolled up; and a support plate which is coupled to one end surface of the electrode assembly where the rolled first electrode plate, second electrode plate, and separator are exposed, so as to support the electrode assembly. A secondary battery according to an embodiment of the present invention comprises a support plate coupled to the lower end of an electrode assembly, whereby, when the secondary battery falls, movements of the electrode assembly can be prevented, and deformation of the electrode assembly due to an external impact can be suppressed.

21 Claims, 6 Drawing Sheets

(56) References Cited

U.S. PATENT DOCUMENTS

| | | |
|---|---|---|
| 7,803,480 B2 | 9/2010 | Lee |
| 8,105,713 B2 | 1/2012 | Kim |
| 8,822,065 B2 | 9/2014 | Byun et al. |
| 10,381,677 B2 | 8/2019 | Kato et al. |
| 2005/0084753 A1 | 4/2005 | Kim |
| 2005/0287429 A1 | 12/2005 | Cho et al. |
| 2006/0073380 A1* | 4/2006 | Kim .................. H01M 10/0587 |
| | | 29/623.1 |
| 2008/0102354 A1 | 5/2008 | Lee |
| 2008/0292946 A1 | 11/2008 | Lee |
| 2010/0233521 A1 | 9/2010 | Byun et al. |
| 2011/0117414 A1* | 5/2011 | Choi .................... H01M 50/44 |
| | | 429/144 |

FOREIGN PATENT DOCUMENTS

| | | |
|---|---|---|
| JP | 2005123186 A | 5/2005 |
| KR | 1999-0068890 A | 9/1999 |
| KR | 20040003153 A | 1/2004 |
| KR | 10-2006-0059698 A | 6/2006 |
| KR | 10-0833739 B1 | 5/2008 |
| KR | 10-2010-0102542 A | 9/2010 |
| KR | 10-2013-0085324 A | 7/2013 |
| KR | 20140087364 A | 7/2014 |
| KR | 10-2016-0048592 A | 5/2016 |
| KR | 10-2016-0091616 A | 8/2016 |
| KR | 1020160098051 A | 8/2016 |

OTHER PUBLICATIONS

Korean Notice of Allowance for Application No. 10-2017-0066844 dated Jan. 25, 2022, 2 pages.

* cited by examiner

SECONDARY BATTERY

CROSS-REFERENCE TO RELATED APPLICATION(S)

This application is a continuation of U.S. patent application Ser. No. 16/613,090, filed on Nov. 12, 2019, which is a National Phase Patent Application of International Patent Application Number PCT/KR2017/014046, filed on Dec. 4, 2017, which claims priority of Korean Patent Application No. 10-2017-0066844, filed May 30, 2017. The entire contents of which are incorporated herein by reference.

TECHNICAL FIELD

The present invention relates to a secondary battery. More particularly, the present invention relates to a secondary battery having a device for protecting a battery cell and an electrode assembly.

BACKGROUND ART

Unlike a primary battery, a secondary battery may be charged and discharged. Low-capacity secondary batteries having a single battery cell packaged in the form of a pack are widely employed in small, portable electronic devices, such as cellular phones, camcorders, and the like, while large-capacity secondary batteries having several tens of battery packs connected to each other are typically used for driving motors of hybrid automobiles.

The secondary battery may be manufactured in various types. Among these secondary batteries, a prismatic battery includes an electrode assembly formed by installing a separator as an insulator between a positive electrode plate and a negative electrode plate, and a thin, flexible pouch case accommodating the electrode assembly. The pouch case accommodates the electrode assembly in an internal space formed by welding edge portions of the pouch case to each other.

The pouch type secondary battery is configured by installing an electrode assembly having a separator as an insulator between a positive electrode plate and a negative electrode plate and an electrolyte in a pouch case. Here, a representative example of the electrode assembly may be a jelly-roll type electrode assembly. The jelly-roll type electrode assembly accommodated in the pouch type secondary battery may become vulnerable to severe movement or edge deformation due to an external impact during, for example, falling of the battery, resulting in short-circuits.

Technical Problems to be Solved

The present invention provides a secondary battery, which can prevent movement of an electrode assembly when the secondary battery falls.

The present invention also provides a secondary battery, which can suppress deformation of the electrode assembly due to an external impact.

Technical Solutions

According to an embodiment of the present invention, there is provided a secondary battery including a pouch case; an electrode assembly accommodated in the pouch case and including a first electrode plate, a second electrode plate, and a separator positioned between the first electrode plate and the second electrode plate; and a support plate which is coupled to and partially inserted into one end surface of the electrode assembly where the rolled first electrode plate, second electrode plate, and separator are exposed, so as to support the electrode assembly.

The support plate may include a base plate coupled to the electrode assembly so as to cover a lower end surface where the rolled electrode assembly is exposed; and a rib upwardly extending from the base plate so as to be inserted into the electrode assembly.

The rib may be centrally located on the base plate so as to be inserted into the electrode assembly from a central portion of the lower end of the electrode assembly.

In addition, the rib may be shaped of a plate extending on an imaginary center line of the support plate along a length direction of the support plate.

In addition, the rib may include multiple protrusions located on the imaginary center line of the support plate so as to be spaced apart from one another.

In addition, the rib may include multiple ribs in forms of protrusions spaced apart from one another along the imaginary center line of the support plate and located at regions close to opposite ends of the support plate.

In addition, the rib may be tapered upwardly from the support plate.

In addition, the rib may have opposite-end edges each having a linear section perpendicular to the base plate.

The base plate may include multiple trenches located in a length direction.

The rib may be shaped of a porous sheet having multiple through-holes.

The base plate may further include at least one electrolyte passing hole located at a portion connected to the rib.

The electrode assembly may further include a first electrode tab protruding a predetermined length from a surface opposite to the one end surface of the electrode assembly, where the support plate is mounted, and electrically connected to the first electrode plate, and a second electrode tab protruding a predetermined length from the surface opposite to the one end surface of the electrode assembly, where the support plate is mounted, and electrically connected to the second electrode plate.

The pouch case may accommodate the electrode assembly having the support plate coupled thereto and may allow the first electrode tab and the second electrode tab to outwardly protrude and extend therefrom.

Advantageous Effects

As described above, the secondary battery according to an embodiment of the present invention includes a support plate coupled to a lower end of an electrode assembly, thereby preventing movement of the electrode assembly and suppressing deformation of the electrode assembly due to an external impact exerted when the secondary battery falls.

BEST MODE FOR CARRYING OUT THE INVENTION

Figure 1A:
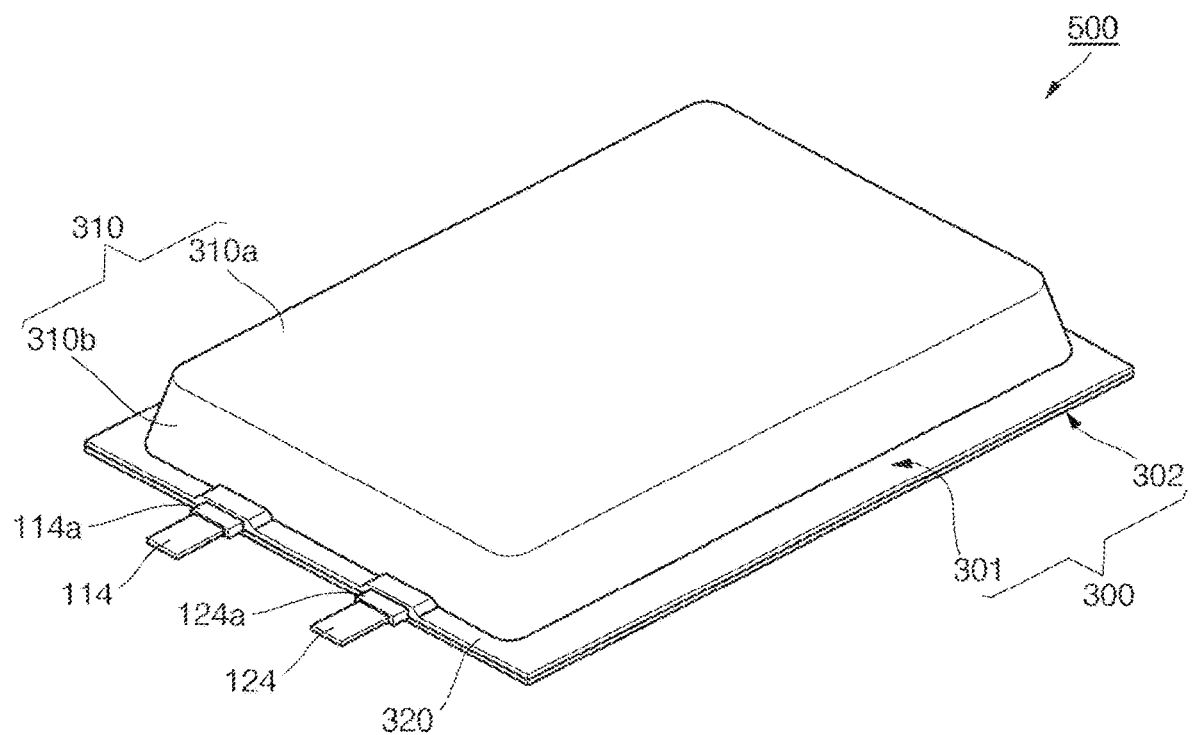
FIG. 1A is a perspective view of a pouch type secondary battery according to an embodiment of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1B:
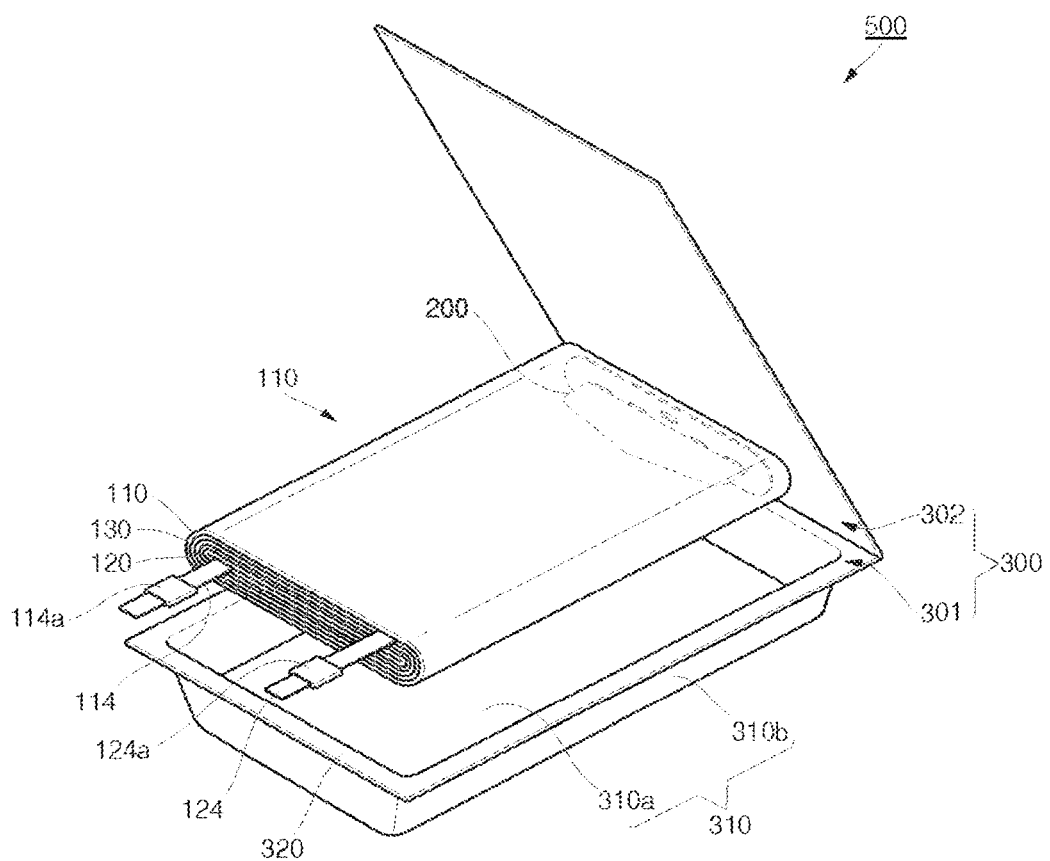
FIG. 1B is an exploded perspective view of the pouch type secondary battery shown in FIG. 1A

FIG. 1A is a perspective view of a pouch type secondary battery according to an embodiment of the present invention, and FIG. 1B is an exploded perspective view of the pouch type secondary battery shown in FIG. 1A.

Referring to FIGS. 1A and 1B, the secondary battery 500 according to the present invention includes an electrode assembly 100, a support plate 200 and a pouch case 300. The pouch case 300 may include a pouch body 301 in which the electrode assembly 100 is accommodated, and a pouch cover 302 coupled to the pouch body 301. In addition, FIG. 1A is a perspective view of the pouch type secondary battery according 500 viewed from a direction of the pouch body 301 of the pouch case 300, and FIG. 1B is an exploded perspective view of the pouch type secondary battery 500 viewed from a direction of the pouch cover 302 of the pouch case 300, opposite to the direction viewed from the pouch body 301.

The electrode assembly 100 includes a first electrode plate 110, a second electrode plate 120 and a separator 130 positioned between the first electrode plate 110 and the second electrode plate 120. The electrode assembly 100 is manufactured by rolling a stacked structure including the first electrode plate 110, the second electrode plate 120 and the separator 130 in a jelly-roll configuration. The electrode assembly 100 includes a planar portion where the first electrode plate 110, the second electrode plate 120 and the separator 130 are planarly rolled, a round portion where the first electrode plate 110, the second electrode plate 120 and the separator 130 are rolled in a curved manner, and upper and lower end surfaces, where a stacked structure including the first electrode plate 110, the second electrode plate 120 and the separator 130 stacked in layers is exposed. Here, the first electrode plate 110 may be a positive electrode and the second electrode plate 120 may be negative electrode, or vice versa. The electrode assembly 100 is accommodated in the pouch case 300.

If the first electrode plate 110 is a positive electrode, the positive electrode, that is, the first electrode plate 110, may include a first electrode active material layer coated on both surfaces of a first electrode current collector made of a highly conductive metal thin plate, such as, for example, an aluminum (Al) foil. Here, the first electrode active material layer may be made of a chalcogenide compound including, for example, complex metal oxides, such as LiCoO2, LiMn2O4, LiNiO2, or LiNiMnO2, but aspects of the present invention are not limited thereto. A first electrode tab 114 is located at a first electrode uncoated portion where the first electrode active material layer of the first electrode plate 110 is not located. One end of the first electrode tab 114 is electrically connected to the first electrode uncoated portion and the other end of the first electrode tab 114 is drawn out to an exterior side of the pouch case 300. Meanwhile, an insulation tape 114a is attached to a region of the first electrode tab 114 making contact with the pouch case 300. The insulation tape 114a may be made of polyphenylene sulfide (PPS), polyimide (PI) or polypropylene (PP), but aspects of the present invention are not limited thereto.

If the second electrode plate 120 is a negative electrode, the negative electrode, that is, the second electrode plate 120, may include a second electrode active material layer coated on both surfaces of a second electrode current collector made of a conductive metal thin plate, such as, for example, a copper (Cu) or nickel (Ni) foil. Here, the second electrode active material layer may be made of a carbon-series material, Si, Sn, a tin oxide, a tin alloy complex, a transition metal oxide, a lithium metal nitride or a metal oxide, but aspects of the present invention are not limited thereto. A second electrode tab 124 is located at a second electrode uncoated portion where the second electrode active material layer of the second electrode plate 120 is not located. One of the second electrode tab 124 is electrically connected to the second electrode uncoated portion and the other end of the second electrode tab 124 is drawn out to an exterior side of the pouch case 300. Meanwhile, an insulation tape 124*a* is attached to a region of the second electrode tab 124 making contact with the pouch case 300.

The separator 130 is positioned between the first electrode plate 110 and the second electrode plate 120 to prevent an electric short-circuit from occurring between the first and second electrode plates 110 and 120. In addition, the separator 130 made from a porous film may allow lithium ions to move between the first electrode plate 110 and the second electrode plate 120. The separator 130 may be made of one selected from the group consisting of polyethylene, polypropylene and a copolymer of polyethylene and polypropylene, but aspects of the present invention are not limited thereto. The separator 130 may have a larger width than the first and second electrode plates 110 and 120 to prevent the first and second electrode plates 110 and 120 from being electrically short-circuited.

The first electrode plate 110 and the second electrode plate 120 of the electrode assembly 100 are electrically connected to the first electrode tab 114 and the second electrode tab 124, respectively.

The electrode assembly 100 is practically accommodated in the pouch case 300 with an electrolyte. The electrolyte may include an organic solvent such as ethylene carbonate (EC), propylene carbonate (PC), diethyl carbonate (DEC), ethyl methyl carbonate (EMC), or dimethyl carbonate (DMC); and a lithium salt such as $LiPF_6$ or $LiBF_4$. The electrolyte may be in a liquid, solid, or gel phase.

The first electrode tab 114 is electrically connected to the first electrode plate 110 of the electrode assembly 100. The first electrode tab 114 may outwardly extend and protrude through the planar portion 320 of the pouch case 300. Here, the first electrode tab 114 further includes a first insulation tape 114*a* provided inside the planar portion 320 to cover the first electrode tab 114. The first insulation tape 114*a* may prevent the pouch case 300 from being electrically shorted from a metal layer. In addition, the first electrode tab 114 may be made of aluminum or an aluminum alloy, but aspects of the present invention are not limited thereto.

The second electrode tab 124 is electrically connected to the second electrode plate 120 of the electrode assembly 100. The second electrode tab 124 may outwardly extend and protrude through the planar portion 320 of the pouch case 300. Here, the second electrode tab 124 further includes a second insulation tape 124*a* provided inside the planar portion 320 to cover the second electrode tab 124. The second insulation tape 124*a* may prevent the pouch case 300 from being electrically shorted from a metal layer.

The first electrode tab 114 and the second electrode tab 124, which are in forms of planar sheets, may outwardly protrude and extend from the pouch case 300 through the planar portion 320 located frontward to be parallel with each other. The first electrode tab 114 and the second electrode tab 124 outwardly exposed from the pouch case 300 may be electrically connected to a protection circuit device and a board, although not shown, which are installed for safety of the pouch type secondary battery 500.

The pouch case 300 may include a pouch body 301 and a pouch cover 302, which are generally provided by folding an integrally formed rectangular pouch film on the basis of a length direction of one side of the rectangular pouch film. Alternatively, the pouch case 300 may also be provided by folding separately formed pouch films having respective folded portions of the pouch body 301 and the pouch cover 302 separated from each other.

The pouch body 301 includes a receiving portion 310 that is a groove in which the electrode assembly 100 is received. The receiving portion 310 is provided by performing a pressing process of applying a pressure to a rectangular pouch film using a mold shaped to correspond the receiving portion 310. The receiving portion 310 includes a bottom portion 310*a* that is a planar sheet and an integrated side portion 310*b* extending a predetermined height from four corners of the bottom portion 310*a* so as to be perpendicular to the bottom portion 310*a*. That is to say, the receiving portion 310 has a substantially hexagonal structure having one side facing the bottom portion 310*a* opened.

In addition, the pouch body 301 further includes a planar portion 320 that is bent from an end of the side portion 310*b* and outwardly extends along the edge of the receiving portion 310 so as to be parallel with the bottom portion 310*a*.

The pouch body 301 has a multi-layered thin film structure including a metal thin film and insulation layers formed on its one surface and the other surface of the metal thin film. The pouch cover 302 may also have the same multi-layered structure as the pouch body 301.

The support plate 200 may be mounted on the electrode assembly 100 to cover one end surface of the electrode assembly 100, where the stacked structure including the rolled first electrode plate 110, second electrode plate 120 and separator 130 is exposed, and may support the electrode assembly 100. Here, the one end surface of the electrode assembly 100 may be opposite to a surface of the electrode assembly 100, from which the first electrode tab 114 and the second electrode tab 124 protrude. For example, if the first electrode tab 114 and the second electrode tab 124 protrude from an upper end surface of the electrode assembly 100, the support plate 200 is mounted on a lower end surface of the electrode assembly 100, or vice versa, but aspects of the present invention are not limited thereto.

Figure 2A:
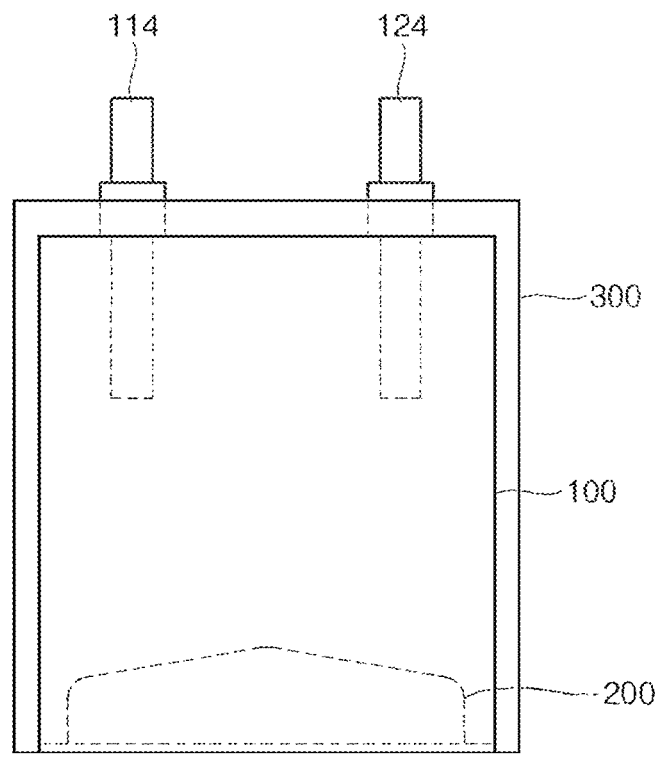
FIG. 2A is a plan view illustrating a state in which an electrode assembly according to an embodiment of the present invention is coupled to a support plate and inserted into a case.
Figure 2B:
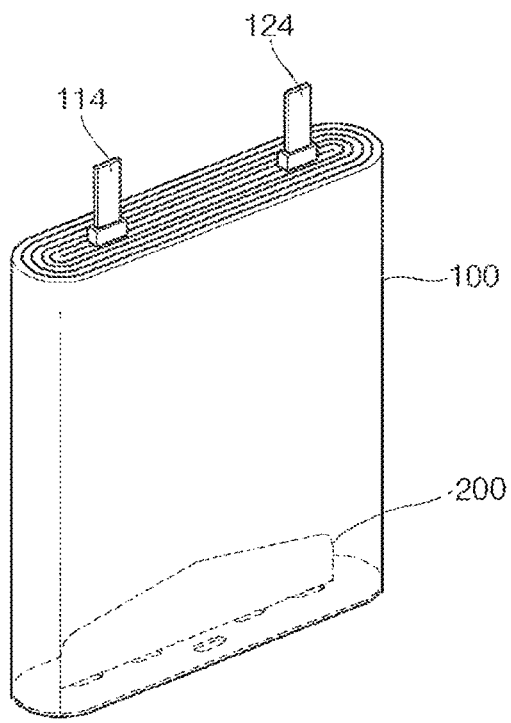
FIG. 2B is a perspective view illustrating the electrode assembly having the support plate coupled thereto.

FIG. 2A is a plan view illustrating a state in which an electrode assembly according to an embodiment of the present invention is coupled to a support plate and inserted into a case, and FIG. 2B is a perspective view illustrating the electrode assembly having the support plate coupled thereto.

Figure 3:
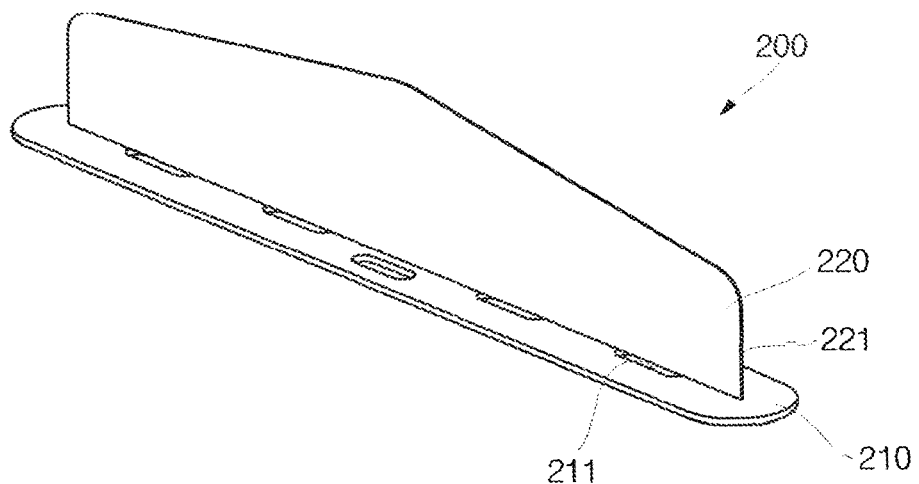
FIG. 3 is a perspective view illustrating a support plate according to an embodiment of the present invention.

FIG. 3 is a perspective view illustrating a support plate according to an embodiment of the present invention.

Referring to FIGS. 2A, 2B and 3, the support plate 200 is positioned to support the electrode assembly 100 from a bottom portion of the electrode assembly 100. That is to say, the support plate 200 is coupled to the electrode assembly 100 so as to entirely cover the lower end surface of the electrode assembly 100, where the first electrode plate 110, the second electrode plate 120 and the separator 130 are stacked one upon another and exposed. Accordingly, the support plate 200 preferably has a sectional area equal to or larger than an area of the lower end surface of the electrode assembly 100.

Meanwhile, the support plate 200 includes a base plate 210 and a rib 220. The base plate 210 is sized to correspond to the lower end surface of the electrode assembly 100. For example, if the secondary battery 500 is an elongated prismatic battery, the base plate 210 is shaped of a long sheet so as to correspond to the battery shape. In addition, the base plate 210 may further include at least one electrolyte passing hole 211 to facilitate movement of an electrolyte. The rib 220 is shaped of a sheet extending in a length direction of the base plate 210, that is, in an upwardly extending direction from the central portion of the major axis direction. The base plate 210 and the rib 220 may be integrated with each other from the start of providing the support plate 200, or may be separately provided to then be assembled with each other.

Referring to FIG. 2A, the support plate 200 is coupled to the electrode assembly 100 such that the rib 220 is inserted into the electrode assembly 100 from the center of the lower end surface of the electrode assembly 100. In addition, referring to FIG. 2B, the electrode assembly 100 coupled to the support plate 200 is inserted into the interior of the pouch case 300.

Referring to FIG. 3, a length of a lower end surface of the rib 220 may be smaller than that of the base plate 210, and the rib 220 may be upwardly tapered to be easily inserted into the electrode assembly 100. In the embodiment shown in FIG. 3, the rib 220 has a pentagonal shape having a top end edge portion. In addition, a height of the rib 220 may be long enough to securely fix the support plate 200 to the electrode assembly 100.

As described above, the rib 220 may be centrally located on the base plate 210. However, the rib 220 may also be located so as to upwardly extend from ends of the base plate 210. In this case, the rib 220 may fix the electrode assembly 100 at opposite lower ends of the electrode assembly 100, and the electrode assembly 100 may be inserted into the support plate 200 to then be fixed. However, the rib 220 is more preferably located to upwardly extend on a length direction of the base plate 210, that is, on an imaginary center line, to then be inserted into the electrode assembly 100.

In addition, the rib 220 preferably has linear sections 221 at its opposite-end edges. More preferably, the linear sections 221 located at the opposite-end edges of the rib 220 are perpendicular to the base plate 210. For the purpose of dispersing the force exerted when the secondary battery falls, the linear sections 221 are necessarily provided in the rib 220.

In addition, the rib 220 may be made of PP, PE, PBT or high-strength engineering plastic. The rib 220 may have a width in the range from approximately 0.3 mm to approximately 0.5 mm and a height of approximately 2 mm. However, the width, the height and a horizontal length of the rib 220 may vary in many ways according to the size of the electrode assembly 100.

The rib 220 of the support plate 200 may be inserted into a central portion of the electrode assembly 100 when assembling the electrode assembly 100, thereby allowing the electrode assembly 100 to keep balance by preventing movement of the base plate 210. In addition, the base plate 210 may support the electrode assembly 100 from the lower end of the electrode assembly 100, thereby suppressing the electrode assembly 100 from being deformed at the lower end and tightly holding the rib 220 so as to be maintained at a state in which the rib 220 is inserted into the electrode assembly 100.

FIGS. 4 to 8B illustrate various examples of support plates according to other embodiments of the present invention.

Figure 4:
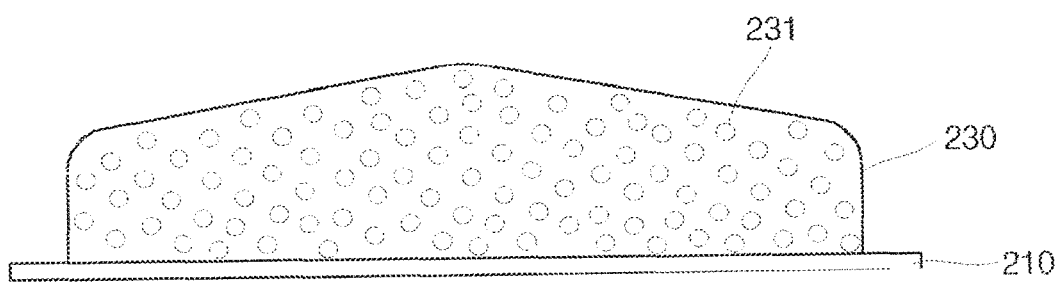
FIGS. 4 to 8B illustrate various examples of support plates according to other embodiments of the present invention.

Referring to FIG. 4, a rib 230 of the support plate 200 may be shaped of a porous sheet having multiple through-holes 231. In this case, the multiple through-holes 231 may provide electrolyte moving passing passages, thereby enhancing electrolyte wetting capability of the rib 230. In addition, the multiple through-holes 231 may not be necessarily located in the rib 230, but multiple electrolyte passing holes 211 may be located at a portion where the base plate 210 and the rib 230 are coupled to each other. (Because FIG. 4 presents a side view of the support plate 200, a view of the multiple electrolyte passing holes 211 are obscured by the edge of the base plate 210, and therefore the multiple electrolyte passing holes 211 are not explicitly shown.)

Figure 5:
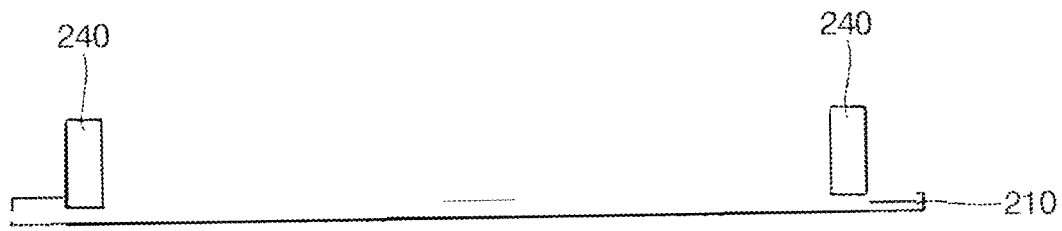

Referring to FIG. 5, a rib 240 of the support plate 200 may include a pair of ribs in forms of protrusions spaced apart from each other. In this case, the pair of spaced-apart ribs 240 are positioned at regions close to opposite ends of the base plate 210.

Figure 6:

Referring to FIG. 6, a modified example of the rib 240 shown in FIG. 5, that is, a rib 250, is shown. The rib 250 shown in FIG. 6 includes ribs in forms of triangular protrusions located at opposite ends of the base plate 210. In this case, outer edges of the opposite ribs 250 are preferably perpendicular to the base plate 210 and inner edges thereof are preferably inclined with respect to the base plate 210.

Figure 7:
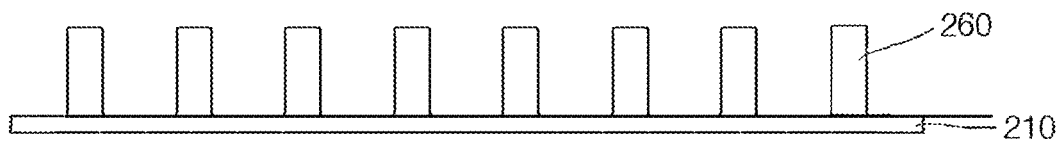

Referring to FIG. 7, a rib 260 includes multiple protrusions, rather than a single protrusion or a pair of protrusions. Although FIG. 7 shows the rib 260 having a rectangular shape, the rib 260 may include protrusions having a variety of shapes, including, for example, triangular protrusions (FIG. 6) or pentagonal protrusions being smaller in size than the pentagonal rib shown in FIGS. 3 and 4.

Figure 8A:
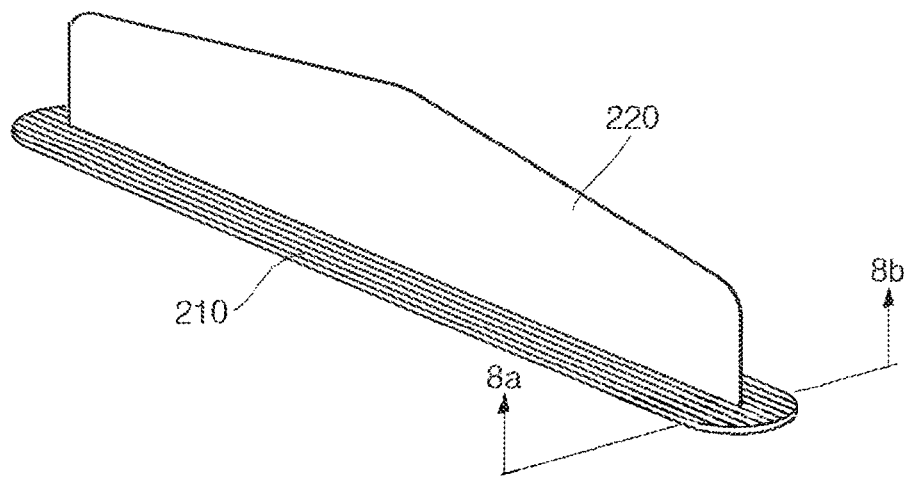
Figure 8B:
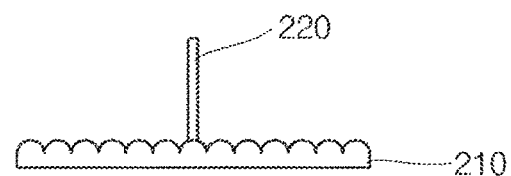

Referring to FIGS. 8A and 8B, the support plate 200 may have an undulating top surface on which multiple trenches are provided in a length direction of the support plate 200. The trenches of a wave-like shape may be correspondingly provided according to a stacking distance in the electrode assembly 100 including the first electrode plate 110, the second electrode plate 120 and the separator 130. However, for purposes of providing electrolyte moving passages and reinforcing the rigidity of the electrode assembly 100, the trenches may be provided, irrespective of the stacking distance.

Figure 9:
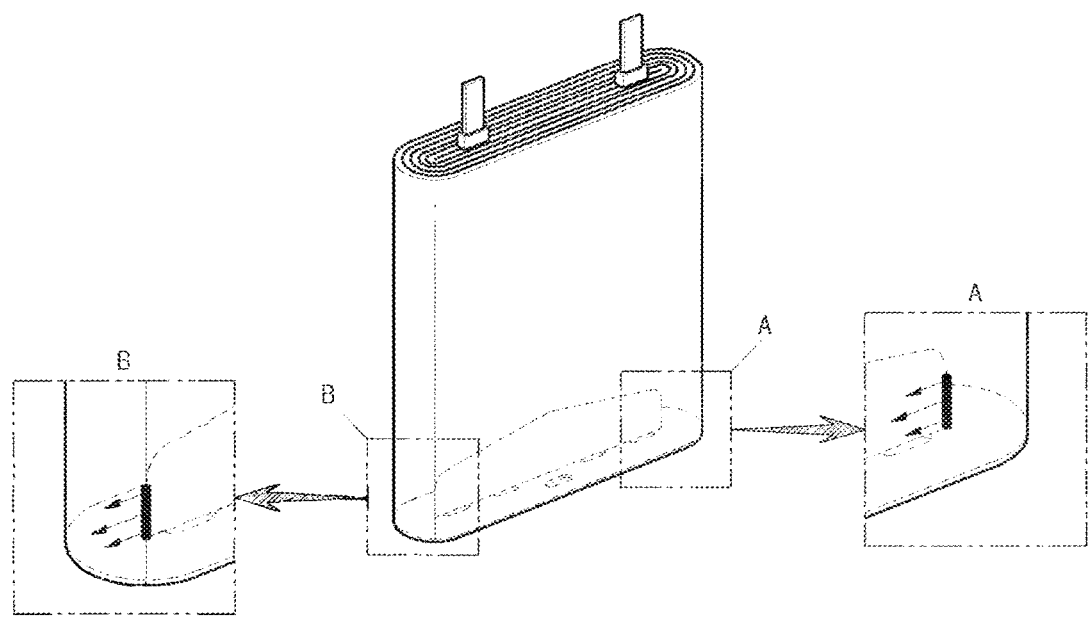
FIG. 9 illustrates a direction in which an external impact is absorbed when a secondary battery falls.

FIG. 9 illustrates a direction in which an external impact is absorbed when a secondary battery falls.

Referring to FIG. 9, when a secondary battery falls, particularly when the secondary battery falls such that corners thereof are first brought into contact with the bottom, a great impact may be exerted to corner portions of an electrode assembly. If an impact applied from the bottom is exerted to a corner portion A of FIG. 9, the impact may be dispersed toward a corner portion B through a linear section of a rib of a support plate. That is to say, the impact absorbed by the corner portion A may be dispersed along the support plate without being transmitted to the electrode assembly. Accordingly, deformation of the electrode assembly due to the external impact exerted when the secondary battery falls can be suppressed.

The support plate can prevent movement of the electrode assembly during assembling of the electrode assembly, thereby allowing the electrode assembly to keep balance. In addition, the support plate includes a planar base plate coupled to the electrode assembly, thereby preventing the electrode assembly from being bent.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

INDUSTRIAL APPLICABILITY

The present invention relates to a secondary battery, and particularly to a secondary battery including a device for protecting a battery cell and an electrode assembly.

What is claimed is:

1. A secondary battery comprising:
   a case;
   an electrode assembly, comprising a positive electrode plate, and accommodated in the case; and
   a support plate including a plate-shaped base plate at one end of the electrode assembly and supporting the one end of the electrode assembly, such that at least a first portion of the support plate covers a lower end surface of the electrode assembly, the lower end surface comprising an end portion of the positive electrode plate and an end portion of a negative electrode plate,
   wherein at least a second portion of the support plate is located at a wound inner portion of the electrode assembly, and is electrically insulated from the positive electrode plate.

2. The secondary battery as claimed in claim 1, wherein the support plate comprises a rib that protrudes from the base plate and is inserted into the wound inner portion of the electrode assembly.

3. The secondary battery as claimed in claim 2, wherein the rib has a plate shape comprising any one of a semicircular shape, a circular shape, and a polygonal shape.

4. The secondary battery as claimed in claim 2, wherein the rib is perpendicular to the base plate and is shorter than the base plate in a length direction of the base plate.

5. The secondary battery as claimed in claim 4, wherein the rib is located at a center of the base plate.

6. The secondary battery as claimed in claim 4, wherein the rib comprises a plurality of ribs spaced apart from each other.

7. The secondary battery as claimed in claim 6, wherein some ribs of the plurality of ribs are spaced apart from each other at equal intervals.

8. The secondary battery as claimed in claim 6, wherein respective heights of some ribs of the plurality of ribs are equal to each other.

9. The secondary battery as claimed in claim 1, wherein the base plate has a surface having a plurality of trenches formed in a length direction of the base plate.

10. The secondary battery as claimed in claim 1, wherein the case is a pouch type.

11. The secondary battery as claimed in claim 1, wherein the electrode assembly is wound.

12. A secondary battery comprising:
    a case;
    an electrode assembly, comprising a positive electrode plate, and accommodated in the case; and
    a support plate including a plate-shaped base plate at one end of the electrode assembly and supporting the one end of the electrode assembly, such that at least a portion of the support plate covers a lower end surface of the electrode assembly, the lower end surface comprising an end portion of the positive electrode plate and an end portion of a negative electrode plate,
    wherein opposite ends of the support plate are respectively located at opposite end portions of the electrode assembly in a length direction of the base plate at the one end of the electrode assembly, and is electrically insulated from the positive electrode plate.

13. The secondary battery as claimed in claim 12, wherein the base plate has one or more holes.

14. The secondary battery as claimed in claim 12, wherein the base plate has a surface having a plurality of trenches formed in the length direction of the base plate.

15. The secondary battery as claimed in claim 12, wherein the case is a pouch type.

16. The secondary battery as claimed in claim 12, wherein the electrode assembly is wound.

17. A secondary battery comprising:
    a case;
    an electrode assembly accommodated in the case, and comprising an electrode tab; and
    a rib located at one end of the electrode assembly that is further away from the electrode tab than an opposite end of the electrode assembly,
    wherein at least a portion of the rib is located at an inner portion of the electrode assembly, and
    wherein a height of the rib in a first direction from the one end of the electrode assembly to the opposite end of the electrode assembly is less than a length of the rib in a second direction perpendicular to the first direction.

18. The secondary battery as claimed in claim 17, wherein the rib has a plate shape comprising any one of a semicircular shape, a circular shape, and a polygonal shape.

19. The secondary battery as claimed in claim 17, wherein the rib is shorter than the electrode assembly in a length direction of the rib.

20. The secondary battery as claimed in claim 17, wherein the case is a pouch type.

21. The secondary battery as claimed in claim 17, wherein the electrode assembly is wound.

* * * * *